US011249948B2

(12) United States Patent
Choi

(10) Patent No.: US 11,249,948 B2
(45) Date of Patent: Feb. 15, 2022

(54) SMART LOG FILE MANAGEMENT DEVICE AND METHOD FOR CREATING A SYSTEM LOG MESSAGE CONTAINING INFORMATION ABOUT AN UPDATE TO A FOLDER OR A FILE FOLDER

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

( * ) Notice: Subject to any disclaimer, the term of this patent is extended or adjusted under 35 U.S.C. 154(b) by 218 days.

(21) Appl. No.: 16/176,190

(22) Filed: Oct. 31, 2018

(65) Prior Publication Data

US 2019/0129956 A1 May 2, 2019

(30) Foreign Application Priority Data

Oct. 31, 2017 (KR) .................. 10-2017-0143278
Dec. 5, 2017 (KR) .................. 10-2017-0165758
Oct. 18, 2018 (KR) .................. 10-2018-0124625

(51) Int. Cl.
*G06F 16/16* (2019.01)
*G06F 16/11* (2019.01)

(52) U.S. Cl.
CPC .......... *G06F 16/164* (2019.01); *G06F 16/122* (2019.01)

(58) Field of Classification Search
CPC .............................. G06F 16/164; G06F 16/122
USPC ........................................................ 707/803
See application file for complete search history.

(56) References Cited

U.S. PATENT DOCUMENTS

| 9,773,010 | B1* | 9/2017 | Ganesh | ............... G06F 11/3476 |
| 2007/0198677 | A1* | 8/2007 | Ozhan | .................. G06Q 10/107 |
| | | | | 709/223 |
| 2009/0305732 | A1* | 12/2009 | Marcellino | ............. H04L 51/24 |
| | | | | 455/466 |

(Continued)

FOREIGN PATENT DOCUMENTS

JP 2007-233661 A 9/2007
JP 2012-118670 A 6/2012

(Continued)

OTHER PUBLICATIONS

Korean Office Action for related KR application No. 10-2017-0143278 dated Dec. 27, 2018 from Korean Intellectual Property Office.

(Continued)

*Primary Examiner* — Alicia M Antoine
(74) *Attorney, Agent, or Firm* — Paratus Law Group, PLLC

(57) ABSTRACT

A smart log file management device includes: a memory and a processor electrically connected to the memory, the processor being configured to: create a system log message containing information about an update to a folder or a file in the folder, if the folder or file is updated by a user terminal; create a user log message containing information about the user related to the update to the folder of file; and create a smart log message containing association analysis information which is statistical information obtained by analyzing either or both of the system log message and the user log message.

20 Claims, 9 Drawing Sheets

(56) References Cited

U.S. PATENT DOCUMENTS

| | | | | |
|---|---|---|---|---|
| 2012/0042012 A1* | 2/2012 | Darnell | ............... | G06F 16/9535 |
| | | | | 709/203 |
| 2012/0331398 A1* | 12/2012 | Madnani | ................. | H04L 51/16 |
| | | | | 715/752 |
| 2013/0067015 A1* | 3/2013 | Vasters | ................ | G06Q 10/107 |
| | | | | 709/207 |
| 2014/0082093 A1* | 3/2014 | Savage | ................... | H04L 41/50 |
| | | | | 709/206 |
| 2014/0359465 A1* | 12/2014 | Litan Sever | ........ | G06F 3/04817 |
| | | | | 715/738 |
| 2016/0050307 A1* | 2/2016 | Yan | ..................... | H04W 68/005 |
| | | | | 455/412.2 |

FOREIGN PATENT DOCUMENTS

| | | |
|---|---|---|
| JP | 2015-041335 A | 3/2015 |
| KR | 10-1169801 B1 | 7/2012 |
| KR | 10-2017-0063994 A | 6/2017 |
| WO | WO 2016/132717 A1 | 8/2016 |

OTHER PUBLICATIONS

Korean Office Action for related KR application No. 10-2017-0165758 dated Jun. 26, 2019 from Korean Intellectual Property Office.

Korean Office Action for related KR application No. 10-2018-0124625 dated Nov. 18, 2019 from Korean Intellectual Property Office.

\* cited by examiner

SMART LOG FILE MANAGEMENT DEVICE AND METHOD FOR CREATING A SYSTEM LOG MESSAGE CONTAINING INFORMATION ABOUT AN UPDATE TO A FOLDER OR A FILE FOLDER

CROSS-REFERENCE TO PRIOR APPLICATIONS

This application claims priority to Korean Patent Application Nos. 10-2017-0143278 (filed on Oct. 31, 2017), 10-2017-0165758 (filed on Dec. 5, 2017), and 10-2018-0124625 (filed on Oct. 18, 2018), which are all hereby incorporated by reference in their entirety.

BACKGROUND

Field of the Invention

The present invention relates to a log file management technique, and more particularly, to a smart log file management device and method that improve user convenience because the system and method allow for efficient management of file updates by a user and let the user intuitively know about them.

Related Art

A file management program may be implemented by applications that store and manage users' files in user accounts on a server, and may provide a function for uploading or downloading files requested by the users. With the increasing number of users who use file-management programs, a variety of file management applications are being developed to support efficient file sharing and management between various users.

SUMMARY

An exemplary embodiment of the present invention provides a smart log file management device and method that improve user convenience because the system and method allow for efficient management of file updates by a user and let the user intuitively know about them.

An exemplary embodiment of the present invention provides a smart log file management device and method that support facilitating the sharing of updates to be notified between file sharers by responses from users in a file updating process.

According to an exemplary embodiment of the present invention, there is provided a smart log file management device comprising a memory and a processor electrically connected to the memory, the processor being configured to create a system log message containing information about an update to a folder or a file in the folder, if the folder or file is updated by a user terminal, create a user log message containing information about the user related to the update to the folder of file and create a smart log message containing association analysis information which is statistical information obtained by analyzing either or both of the system log message and the user log message.

DETAILED DESCRIPTION

Figure 1:
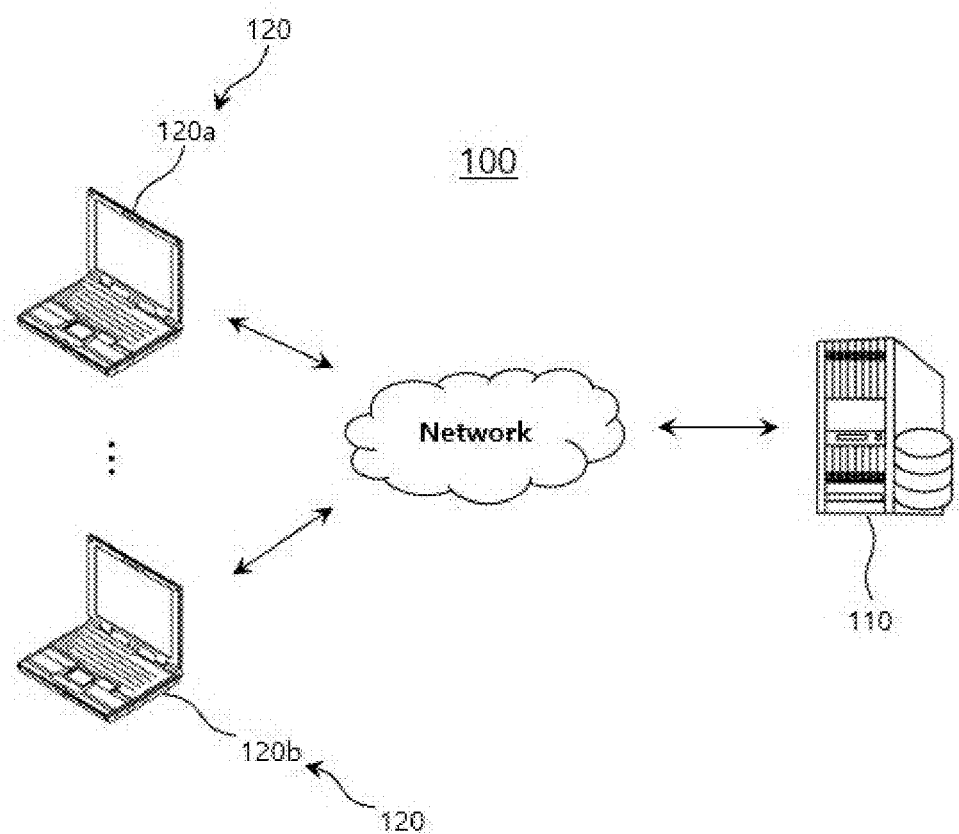
FIG. 1 is a view illustrating a smart log file management system according to an exemplary embodiment of the present invention.

Explanation of the present invention is merely embodiments for structural or functional description, so the scope of the present invention should not be construed to be limited to the embodiments explained in the embodiment. That is, since the embodiments may be implemented in several forms, it should also be understood that the scope of the present invention includes equivalents able to realize its technical idea. In addition, it does not mean that a specific embodiment embraces all the purposes or effects suggested in the present invention or embraces only such effects, and therefore, it should be understood that the scope of the present invention is not limited thereto.

Meanwhile, terms used in the following description need to be understood as below.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

Indication references of steps (i.e., a, b, and c) are used for convenience of explanation and do not indicate a sequence of the steps. Unless explicitly defined as a specific sequence in the context, the indication references may be performed in a different order. That is, each step can be substantially performed at the same time or can be performed in reverse order in accordance with a function corresponding to the block.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable recording medium may be distributed in a computer system connected by a network, and store and implement a computer-readable code in a distributed manner.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

FIG. 1 is a view illustrating a smart log file management system according to an exemplary embodiment of the present invention.

Referring to FIG. 1, the smart log file management system 100 includes a smart log file management device 110 and a user terminal 120.

The smart log file management device 110 may be a computing device that may be connected via a network to at least one user terminal 120. In an exemplary embodiment, the smart log file management device 110 may manage at least one group including a user associated with the user terminal 120 as a member.

In an exemplary embodiment, the smart log file management device 110 may be connected to the user terminal 120 through a smart log file agent installed on the user terminal 120. Here, the smart log file agent may be implemented as software that, once installed on the user terminal 120, helps the user terminal 120 and the smart log file management device 110 work together with the approval of the user terminal 120.

The user terminal 120 corresponds to a computing device that can be connected via a network to the smart log file management device 110—for example, a user terminal implemented as a desktop, laptop, tablet pc, or smartphone. In an exemplary embodiment, a first user terminal 120a may correspond to a mobile terminal, and may be connected to the smart log file management device 110 through cellular communication or WiFi communication. In another exemplary embodiment, a second user terminal 120b may correspond to a desktop, and may be connected to the smart log file management device 110 through the internet.

Figure 2:
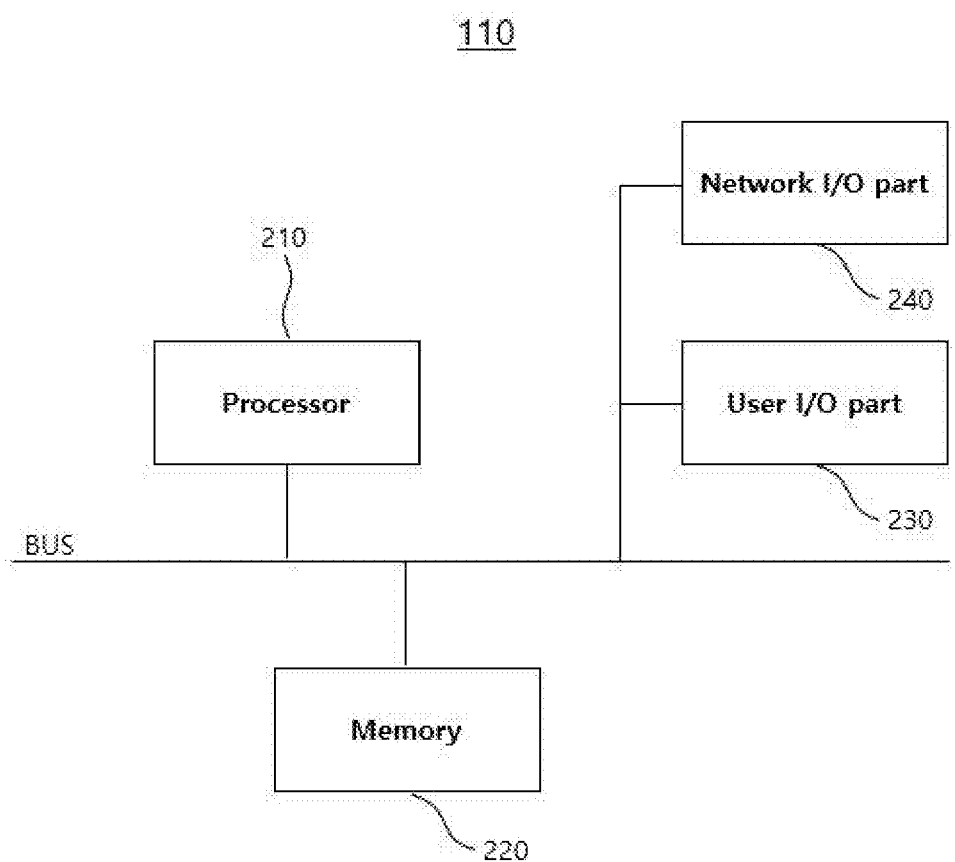
FIG. 2 is a block diagram showing the smart log file management device in FIG. 1.

FIG. 2 is a block diagram showing the smart log file management device in FIG. 1.

Referring to FIG. 2, the smart log file management device 110 may include a processor 210, a memory 220, a user input/output part 230, and a network input/output part 240.

The processor 210 may execute a smart log file management procedure according to an exemplary embodiment of the present invention, and may manage data or files that are read from the memory 220 or written to or stored in the memory 220 in this procedure. Also, the processor 210 may schedule synchronization between volatile and non-volatile memories in the memory 220.

The processor 210 may control the overall operation of the smart log file management device 110, and may be electrically connected to the memory 220, user input/output part 230, and network input/output part 240 and control data follow between them. The processor 210 may be implemented as a CPU (Central Processing Unit) of the folder-based file management device 110.

The memory 220 may include auxiliary storage which is implemented as a non-volatile memory such as SSD (Solid State Disk) or HDD (Hard Disk Drive) and used to store overall data required for the smart log file management device 110 or primary storage which is implemented as a volatile-memory such as RANI (Random Access Memory). That is to say, the memory 220 may be implemented as a volatile or non-volatile memory, and may be connected by a hyperlink if implemented as a non-volatile memory.

The user input/output part 230 includes an environment for receiving user input and an environment for outputting particular information to the user—for example, an input device including an adapter such as a mouse, trackball, touchpad, graphic tablet, scanner, touchscreen, keyboard, or pointing device, or an output device including an adaptor such as a monitor or touchscreen. In an exemplary embodiment, the user input/output part 230 may correspond to a computing device connected via a remote connection, in which case the smart log file management device 110 may serve as a server.

The network input/output part 240 may include an environment for connecting to the user terminal 120 via a network—for example, an adapter for LAN (Local Area Network) communication.

Figure 3:
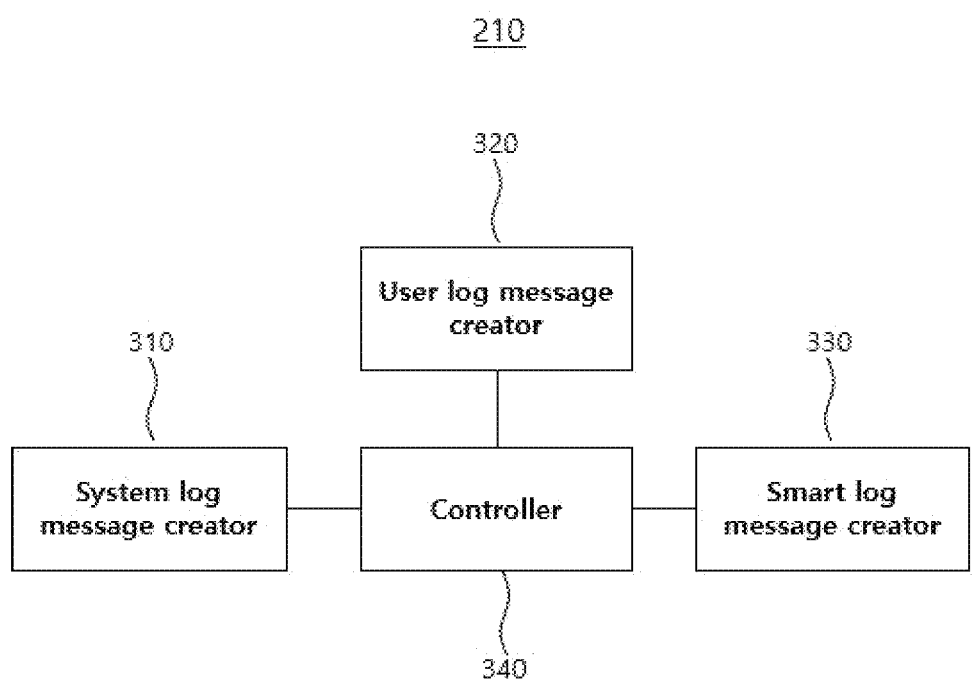
FIG. 3 is a block diagram showing functional elements of the processor shown in FIG. 2.

FIG. 3 is a block diagram showing functional elements of the processor shown in FIG. 2.

Referring to FIG. 3, the processor 210 may include a system log message creator 310, a user log message creator 320, a smart log message creator 330, and a controller 340.

The system log message creator 310 creates a system log message. Here, the system log message contains information about an update made to a file or folder. That is, the system log message may be a message that records a file and/or folder update when a file in a folder is modified, changed, or updated. When an update on a file is made, either or both of a log message on the file update or a log message on the folder of the file may be created.

Here, an update on a file means that the file is modified, changed, or updated and then stored as it is. Therefore, in this instance, the file modification or change and the file update may occur at different times. However, if the file modification or change is regarded as the file update, the file modification and update may occur at the same time. An update to a folder may include creation of a new sub-folder in the folder, a change of the file name, a change in the folder participators, an update to a file in the folder, or a movement of a file between sub-folders in the folder.

Here, the file may include a general user file such as a document file or multimedia file sent from the user terminal 120.

Here, the term 'a file in a folder' or 'a file of the folder' may include any file that is stored in a folder, accessible through a folder, or associated with or linked to a folder. If an update is made to a file in a folder, it is also seen as an update made to the folder, and both a system log message to the file and a system log message to the folder may be created.

If an update is made to a file or the folder of the file as the user terminal 120 updates the file, the system log message creator 310 may create a system log message for the update. The system log message may contain various information related to the file or folder update, such as the update time, the time the updated file was saved, and other details of the update.

In an exemplary embodiment, if an update is made to a specific file as the user terminal 120 modifies or changes the file, the system log message creator 310 may create a system log message containing information related to the update. Here, the user terminal 120 may be the user terminal 120 of a user who is participating in a specific folder. The information related to the update may include at least one of the following: the file update time, the times when the file was saved before and after the modification, the type of file update, user information, and user group information.

Here, a file that has never been updated, including a modification and change, is referred to as an original file for convenience of explanation. If a file update such as a modification or change is made to the original file, the update time may be referred to as the modification time. Also, when an update is made to the original file, a copy file may be created separately from the original file.

In this instance, the update may be applied to the copy file, and the original file may be preserved without being updated. When the user terminal 120 accesses the file, the time the user terminal 120 accessed the file, along with the user terminal 120's identification information, may be recorded. File access logs, updates, and the times when the updates were made may be stored as well.

Accordingly, in an exemplary embodiment, information about the file update time contained in the system log message may include at least one of the following: the time the update was made or the time the updated copy file was created, the last modified time at which each modification to the original file was made, and the last access time for the original file based on the user terminal 120' access logs.

The system log message may contain user information, such as a user identifier, user identification information, and user terminal identification information, which is authorized in the user terminal 120's log in process. In an exemplary embodiment, the system log message creator 310 may retrieve the user ID or user name from the user information of the user terminal 120 and includes it in the system log message.

The system log message creator 310 may further include a user group identifier, which is information on a group the user of the user terminal 120 belongs to, in the system log message. In an exemplary embodiment, the system log message creator 310 may retrieve a user group ID or user group name for a group in which the user of the user terminal 120 participates as a member and further include it in the system log message.

The user log message creator 320 creates a user log message about a file update for the user terminal 120. The user log message contains information on a user related to an update made to a folder or file.

The information on a user related to an update may include information on the user who made an update to a file or folder or a user(s) who will be asked to check the update or give feedback on the update and information on comments added by the user on the update.

Here, the user log message will be explained as having a first portion, a second portion, and a third portion. In an exemplary embodiment of the present invention to be explained with reference to FIG. 3, the first portion of the user log message may contain information on whether the user terminal 120 is asking for feedback, the second portion may contain a copy of part of or the entire updated file, and the third portion may contain user comment information related to a file update such as a modification or change to the file.

Therefore, according to an exemplary embodiment of the present invention, the user log message may be a message consisting of a plurality of sub-messages indicating at least one user comment related to an update, including whether the user is asking for feedback on an update to a file or the folder of the file, the user's intention of the update, and details on the update.

Moreover, the user log message does not always include all of the aforementioned first, second, and third portions, but, in some embodiments, may selectively include only some of these sub-messages.

The first sub-message of the user log message may contain information on whether other users are asked to give feedback on a file update. In this instance, the user log message creator 320 may create a user log message containing feedback request information as the first sub-message.

The feedback request information may be information indicating whether to ask other users to give feedback on an update to a file or the folder of the file.

In an exemplary embodiment, upon detecting a feedback request based on feedback request information received in a file update process and entered by the user, the user log message creator 320 may generate a feedback request signal asking for feedback from other users on a file update and include it in the second portion of the user log message.

For example, the user log message creator 320 may provide a feedback request button as a type of user interface in a file update process. When the user terminal 120 generates a feedback request signal through the feedback request button, a feedback request message asking for feedback may be included as a first sub-message when a user log message is created.

In another exemplary embodiment, when a file is updated, the user log message creator 320 may immediately provide a feedback inquiry message to the user terminal 120 which made the file update, asking whether to give other users feedback on the file update. As an example of the feedback inquiry message, a message saying "Do you want to give other users feedback on the file update? Yes/No" may be provided through a pop-up window.

In response to the feedback inquiry message from the user, the user terminal 120 may send a feedback inquiry response message. Accordingly, the user log message creator 320 may determine whether to include a feedback request signal in the first sub-message of the user log message, based on the feedback inquiry response message from the user. For example, if the user terminal 120 selects [Yes] as a response in the aforementioned feedback inquiry message provided through a pop-up window, the user log message creator 320 may include a feedback request signal in the first portion of the user log message.

In an exemplary embodiment, the user log message creator 320 may designate one or more other users who will be asked to give feedback on an update, in the process of affirming the user's intention about feedback. That is, the user terminal 120 may designate who will be asked to give feedback, by a method like presetting a user group obliged to give feedback on a specific update to a specific file. Also, user information or user terminal information of a designated user who will be asked to give feedback may be contained in the first portion of the user log message.

For example, in a case where Users A, B, and C are participating in a shared folder, User A may modify a specific file and then request either or both of Users B and C to give feedback on the modification. At this point, information about whom User A asks for feedback on the file modification may be contained in the first portion of the user log message.

Upon receiving a feedback request from the user terminal 120, the user log message creator 320 may notify the user terminal 120 of a user asked to give feedback that the file is updated, when the user logs in. A file update notification message may be used as a method of notifying of the file update. The file update notification message may be a message summarizing what the user log message mainly says about the file update. The file update notification message may contain information such as who updated the file, the file update date and time, and what the file update is mainly about.

Accordingly, according to an exemplary embodiment of the present invention, upon detecting a feedback request about the file update through the first sub-message of the user log message, the user log message creator 320 may provide a file update notification message summarizing what the user log message mainly says about the file update to the user terminal 120 of each of at least one folder participator designated and asked to give feedback.

Afterwards, a response to the first sub-message—that is, feedback request signal—of the user log message may be inputted. That is, other users who have received the user log message may give a response indicating that they have checked the modification as a way of giving feedback in response to the feedback request signal contained in the first sub-message or reupdate the file.

At this point, the user log message creator 320 may generate a signal containing information about whether the file is reupdated by other users, based on the response inputted with respect to the first sub-message—that is, a modification check or file reupdate.

In an exemplary embodiment, when a file update notification response message containing information about whether to reupdate the file is received later, as a response by other users with respect to the aforementioned file update notification message, the user log message creator 320 may generate a notification signal about reupdating the file based on the received file update notification response message and included it in the first sub-message of the user log message.

The user log message creator 320 may copy each updated version of a file or a final version of the file created by updating the original file multiple times, and create it as a checkpoint file. The checkpoint file may be included in the second sub-message of the user log message. That is, the log message creator 320 may include the checkpoint file in the second sub-message of the user log message.

The user log message creator 320 creates a copy of an updated version of a file so that the current version of the file is checked or restored later. Here, the copy may be referred to as a checkpoint file.

For example, upon detecting a first modification to a first file, the user log message creator 320 may make a copy of the modified file as a first checkpoint file and include it in the second sub-message of the user log message, and upon detecting a second modification to the first file later, the user log message creator 320 may make a copy of the second modified file as a second checkpoint file and include it in the second sub-message of the user log message.

In another exemplary embodiment, upon detecting a first modification to a file, the user log message creator 320 may make a copy of the original file as an original checkpoint file and create the updated file as a checkpoint file.

The user log message 320 may manage checkpoint files by making a cumulative copy of the checkpoint files as the second sub-message of the user log message whenever it detects a file modification. Here, the user log message creator 320 may manage recent checkpoint files only for a specific period of time (e.g., 1 month) or up to a specific number of updates (e.g., 100), rather than creating and managing an infinite number of checkpoint files each time a file update is made, and may delete the checkpoint files or move them to a storage space when they become outdated from a given time.

The third sub-message of the user log message may contain user comments about the user's intention of a file update. The user may enter a user supplementary note about the intention, reason, purpose, etc. of an update or reupdate to a specific file, when they modify or change the file. According to the note entered by the user, the user log message creator 320 may include a user comment indicating the user's intention of the update in the third sub-message of the user log message.

Here, the term "the user's intention of the update" will be described in more details below. It may refer to a brief note the user writes of the reason or intention of modifying or changing a file, including for what purpose the user modified the file (e.g., to correct typing mistakes in the overview) and which part of the file was modified for what reason (e.g., to correct inconsistencies between the body and the summary or alter small conclusions). With this note, the user can more easily find and understand which part of the file was modified or details of the modification when viewing updates to the file by other users.

In this instance, according to an example, the smart log file management device 210 may provide a user interface so that a user note field is displayed on the user terminal 120. Then, the user may type a note about the file update they made into the user note field displayed on the user terminal. For example, the intention of the file update, the purpose of the update, and things to be noted about the update may be typed in the user note field. The user log message creator 320, upon receiving a user note (e.g., [Change of subthemes and correction of misspellings], may include a user comment in the third sub-message of the user log message.

Upon completion of a file update, the user log message creator 320 may automatically create a user note based on changes to the existing file and suggest it to the user.

In an exemplary embodiment, upon completion of a file update, the user log message creator 320 may do a comparative analysis of the previous version of the file and a checkpoint file created after the update. If the file is updated two times, a comparative analysis of the original file, a first checkpoint file, and a second checkpoint file may be done.

Through the comparative analysis, the user log message creator 320 may find differences between some other version of the file and a checkpoint file and detect information on at least one between how this change was made and the amount of modification. Based on the information detected through the comparative analysis, the user log message creator 320 may create a user note sample and provide it for display on the user terminal 120. After the user checks and approves the aforementioned user note sample, the user memo sample presents a user comment on the update.

That is, the user may determine whether to store the user note sample created by the user log message creator 320 as a user comment. As a result, the user log message creator 320 may include the user note sample approved by the user in the third portion of the user log message.

For example, the user log message creator 320 may detect a 2-byte modification of [Strategry meeting] to [Strategy meeting] and a 150-byte addition of [The following strategies will be added . . . ] through a comparative analysis of the file before the update and checkpoint files and create a user note sample [Change of subthemes and correction of misspellings]. Once the user log message creator 320 provides the created user note sample to the user terminal 120, the user terminal 120 may suggest the user note sample to the user by visualizing it (for example, the user terminal 120 may display a pop-up window saying "Will you make a note [Change of subthemes and correction of misspellings] to comment on the user's intention of the update or modification?").

Moreover, upon receiving a response "The user approves" from the user terminal 120 about the suggestion of the user note sample, the user log message creator 320 may add the user note sample as a user comment to the third sub-message of the user log message.

The smart log message creator 330 may create a smart log message based on the system log message and the user log message, and may associate the smart log message with the corresponding file or folder.

The smart log message may basically include the system log message and the user log message. Furthermore, according to an exemplary embodiment of the present invention, the smart log message may include association analysis results generated through an association analysis of the system log message and the user log message.

The association analysis results may refer to statistical, analytical, and evaluation results which are obtained by analyzing or summarizing information the system log message or user log message contains about user settings for folder or file updates, responses and non-responses to file or folder updates, and checking or unchecking of file or folder updates.

Here, the association analysis results for the smart log message may include information on a file badge or folder badge. The smart log message creator 330 may create a file badge per user and a folder badge per user, as a file is updated, as a type of information arising from the association analysis for the smart log message.

Here, the file badge per user may indicate the cumulative number of updates per user for the file the user has not yet checked, and the folder badge per user may indicate the cumulative number of updates per user for the folder the user has not yet checked.

The folder badge is a symbol indicating the total number of updates for the folder the user has to check, which may show the number of updates for the folder and the subfolders and files in the folder. That is, the file badge or folder badge may show the number of updates unchecked by the user, among all updates to the file or folder.

Accordingly, the smart log message 330 may create a file badge or folder badge through an association analysis, by using some or all of the following: information on the update time in the system log message, information on the user terminal 120's access time, information about the update contained in the system log message, and information about checkpoint files before and after the modification contained in the user log message.

More specifically, the system log message creator 310 and user log message creator 320 or the smart log message creator 330 may create and manage the user's own file modification history containing information about modifications made to the file or folder. Here, the user may be a folder participator who shares the folder. Also, the smart log message creator 330 may create a file badge per user or folder badge per user by calculating the file badge value based on the file modification history.

For example, if Users A, B, and C are participating in Folder a and User A modifies File a-1 in Folder a, this update affects the folder badge values and file badge values of Users B and C participating in that folder. Due to the file modification by User A, each user's file badge for File a-1 and each user's folder badge for Folder a may be updated on a per-user basis.

In the process of updating a file modification history, the smart log message creator 330 may log a specific number of updates and the file modification dates for the updates in the file modification history, for a specific period in the past from the present or in reverse chronological order. The smart log message creator 330 may manage time stamps, each including one or more among the creation date, the access date, and the modified date, as a time-varying parameter for that file for each user and reflect them as file modification dates in the file modification history.

For example, the system log message creator 310 and user log message creator 320 or the smart log message creator 330 may log and manage file modification dates a, b, c, and d on which multiple users made updates to a single file sequentially in the file modification history. As explained previously, there is no need to store an infinite number of logs in the history, but logs may be stored in the file modification history only for a specific period of time from the present or up to a specific number of logs and reflected on the file badge and the folder badge. In this instance, the other logs older than a default are not reflected on the file badge or folder badge but deleted.

TABLE 1

|  | User A | User B | User C |
|---|---|---|---|
| Modification Information | Creation date 2017.12.01, 10:35:20 | Creation date — | Creation date — |
|  | Modification date 2017.12.1, 18:13:07 | Modification date — | Modification date — |
|  | Access date 2017.12.1, 18:13:07 | Access date 2017.12.1, 11:15:42 | Access date — |

In an exemplary embodiment, the smart log message creator 330 may set a specific number of file modifications according to the following Equation 1 and log the file modification dates on which the specific number of file modifications were made in the file modification history.

$$n = \left\lceil n_0 \frac{m_{av1}}{m_{av2}} \right\rceil \quad \text{[Equation 1]}$$

wherein $m_{av1}$ represents the average daily number of updates to the file over a first specific period (e.g., last week), and $m_{av2}$ represents the average daily number of updates to the file over a second specific period (e.g., last three months). Here, the second specific period is a period of time longer than the first specific period. Here, no represents a reference cumulative number (e.g., 100) of updates and may be set by the user or designer, and ⌈ ⌉ refers to an operation of rounding an internal value to an integer.

For example, assuming that $m_{av1}$ and $m_{av2}$ are detected as 2.6 and 1.4, respectively, and no is set to 50, the smart log message creator 330 may calculate n to be 93 according to the following Equation 1 and determine the calculated n as the specific number which allows for logging file modification dates. The file modification history managed by the smart log message creator 330 may store 93 updates and reflect recent 93 updates on the file badge and/or folder badge Upon completion of a file update, the smart log message creator 330 may keep track of the file modification history for that file and each user's file access time, or may update each user's file badge by analyzing the system log message and/or user log message.

For example, the smart log message creator 330 may check updates to the file and file modification dates from the file modification history for the file as shown in the above Table 1. The updates may contain information about which user the file update was made by.

The user log message creator 320 may create file badges for each user as shown in Table 2 below by counting file modifications made after each user's last access, based on the date each user last accessed the file.

For example, the file badge of User A is updated to 0 since User A created the file and modified it for the last time. The file badge of User B is updated to 1 since the file was created before User B's last access date and one update was created for one modification by User A since User B's last access. The file badge value of User C was incremented by 1 as the file is created and then incremented by 1 as the file was modified, and User C has never accessed the file after the creation and modification of the file. Thus, the file badge of User C may be updated to 2. The file badge values of each user are shown in the following Table 2.

TABLE 2

|  | User A | User B | User C |
|---|---|---|---|
| File badge | 0 | 1 | 2 |

The user log message creator 330 may find out whether the file was read by the user terminal 120 and update the user's file badge for the file. Here, the user log message creator 330 may use information on updates contained in the system log message and user log message and information on the user's access to the file or folder, in finding out whether the user read the file or folder or any updates to the file or folder. Therefore, when the user terminal 120 associated with User C accesses the file with the file badge value of 2 and opens or downloads the file, the file badge of User C may be updated from 2 to 0.

Moreover, the association analysis information may include one or more statistical calculations of at least one of the following: the total number of modifications of the file or other files in the folder, the cumulative number of updates to the file or other files in the folder, the average frequency of updates, the total number of feedback requests, the total number of feedback request responses, the average daily or monthly number of updates/feedback requests/feedback responses, the feedback response rate (the percentage of actual feedback request responses compared to the total number of feedback requests), and the number of smart log messages sent. Also, the priorities, importance, and urgency of information to be checked by the user, too, may be derived from the calculations divided by preset intervals and included in a smart log message.

For example, if a feedback setting [Suggest to ask for feedback] is included in group settings which are associated with a group ID of the user in a system log message in the process of creating a smart log message, the smart log message creator 330 may include the first sub-message [Asked for feedback] of a user log message associated with the feedback setting into the smart log message.

In an exemplary embodiment of the present invention, the smart log message creator 330 may create a smart log message based on the system log message and the user log message and associate it with the file.

For example, the smart log message creator 330 may create a smart log message based on statistical information about: (a) the time the file was saved, the type of file update, user information, and user group information in the system log message; (b) whether or not feedback is asked for, a checkpoint file, a user comment, and the user's file badge value, included in the user log message; (c) user settings and group settings; and (d) the total number of feedback requests, the total number of feedback request responses, the feedback response rate, and the number of smart log messages sent.

Upon receiving a request for access to the file or folder from the user terminal 120, the smart log message creator 330 may analyze the smart log messages for the file or folder and determine whether to provide part of or the entire smart log messages as associated information.

For example, if a user terminal accesses the folder or file, the smart log message creator 330 may automatically provide a smart log message or provide the user terminal 120 with a notification message suggesting to check the smart log message first, upon detecting a preset default number (e.g., 3) of updates or feedback requests since the user's last access through the analysis of smart log messages associated with the folder or file, even if the user terminal 120 does not explicitly request the smart log message creator 330 to provide a smart log message.

The smart log message creator 330 may manage smart log messages within the folder or via another route.

In an exemplary embodiment of the present invention, the smart log message creator 330 may store a smart log message as if it is a user file in the folder of the file. It should be noted that the smart log message 330 may store the smart log message as read-only.

Moreover, the smart log message 330 may update the smart log message as more updates are generated for the file. Upon the user terminal 120's request for access to the smart log message, the smart log message creator 330 may let the user to view the smart log message as read-only.

In another exemplary embodiment, the smart log message creator 330 may store the smart log message as a log file in a specific area of the file system. The smart log message creator 330 may manage the association between the smart log message and the file via a smart log file database (not shown).

At this point, upon receiving a smart log message access or viewing request from the user terminal 120 through the file, the smart log message creator 330 may provide the smart log message in a read-only state in which the smart log message cannot be modified, edited, or deleted. The smart log message creator 330 may reestablish the association between the smart log message and the file by modifying the smart log file database based on the user terminal 120's request.

Upon detecting a file movement, the smart log message creator 330 may record it in the smart log message associated with the file and, at the same time, reestablish the association by moving the smart log message to the same folder as the file or modifying the smart log file database.

Also, the fact that the file was moved may be recorded in the smart log message associated with the folder.

The smart log message creator 330 may be asked by the user terminal 120 to provide details of updates to the file or folder in the process of providing a smart log message. In this instance, the smart log message creator 330 may provide the user terminal 120 with the smart log message, along with the details of updates or the analysis results about changes stated in the user log message.

The analysis results of changes or the details of updates will be described below by way of example.

1. Sub-folder b was created in Folder A and File a-1 and File a-2 were moved from Sub-folder a to Sub-folder b.

2. The name of Sub-folder a in Folder A was changed to b.

3. The name of File a-1 in Folder A was changed to b-1.

4. The first paragraph on page 5 of File a-2 in Folder A was deleted, the second paragraph on page 10 was modified, and the text before the modification and the text after the modification were compared to each other and displayed.

5. New file c-1 was created in Folder A.

6. A statistical message was provided in a format like "2 sub-folder creations, 1 folder name change, and 2 file movements" by summarizing the above updates.

For example, based on the smart log message, the smart log message creator 330 may provide a first checkpoint file before a modification and a second checkpoint file after the modification in association with each other, focusing on modified portions, so as to visually contrast changes before and after the modification or analyze the differences of two or more modifications. Notably, the smart log message creator 330 may summarize updates by using checkpoint files—that is, by taking updated portions and comparing the files before and after a modification or comparing the files before and after a first modification and then before and after a second modification.

When the user terminal 120 logs in, the smart log message creator 330 may provide smart log summary information at a time, which is information about file updates that have been detected since the user last accessed the folder, among all updates to all files the user has access to.

For example, when the user terminal 120 of User A logs in, the smart log message creator 330 may provide a smart log summary list about files that have been modified since User A last logged in, among all files in all folders accessible by User A, so as to help User A see folder and file update statuses at a glance.

The controller 340 may control the overall operation of the processor 210, and may control data flow among the system log message creator 310, user log message creator 320, and smart log message creator 330.

In an exemplary embodiment, the controller 340 may receive a request for access to a specific folder from the user terminal 120 and determine whether to allow the user access to that folder by verifying the user's access to a corresponding file. The controller 340 may verify the user's access to the folder by acquiring user information associated with the user terminal 120, and may only allow the user access to the folder when it verifies the user's access to the folder. The controller 340 may determine the user's access to the folder by letting the folder creator to send an invitation to the user or not when creating the folder.

Once the user terminal 120 is granted access to the folder, the controller 340 may provide the user terminal 120 with file badges for each user for at least one file in the folder, so that the file badges for each user for at least one file in the folder are displayed as well in the process in which the user terminal 120 displays a list of files in the folder.

The controller 340 may accumulate the user's file badges for the folder and its sub-folders and reflect them on the cumulative count of file badges for the folder, based on each user's file badges and file modification histories for each file in the folder.

The controller 340 may detect statistical information about smart log messages associated with all files in the folder and its sub structure and reflect it on cumulative statistical counts in the folder. For example, the controller 340 may accumulate statistical information about at least one of the following: the total number of modifications to the files in the folder and sub-folders, the total number of feedback requests, the total number of feedback request responses, and the number of smart log messages sent and reflect it on the cumulative statistical count for the folder.

Moreover, the controller 340 may determine whether there is a need to automatically provide a smart log message regardless of the user's request. A smart log message may be automatically provided, for example, if more than the number of feedback requests received exceeds a threshold, the number of requests accumulated from other users exceeds a specific number, the value of a file badge or folder badge exceeds a threshold, or the number of unchecked updates to be deleted exceeds a threshold.

If the controller 340 determines that there is a need to provide a smart log message without the user's request, the controller 340 may provide part of or the entire smart log message or may create and present a notification message recommending or suggesting to check smart log messages first.

The controller 340 may arrange the folder or files based on each user's file badges and smart log messages according to the user terminal 120's request. For example, the controller 340 may arrange the files in the folder according to the user terminal 120's request, in order from highest to lowest file badge value of the user (in order of highest to lowest number of unchecked file updates), in order from highest to lowest total number of modifications, in order from highest to lowest total number of feedback requests, or in order from highest to lowest total number of feedback request responses.

Figure 4:
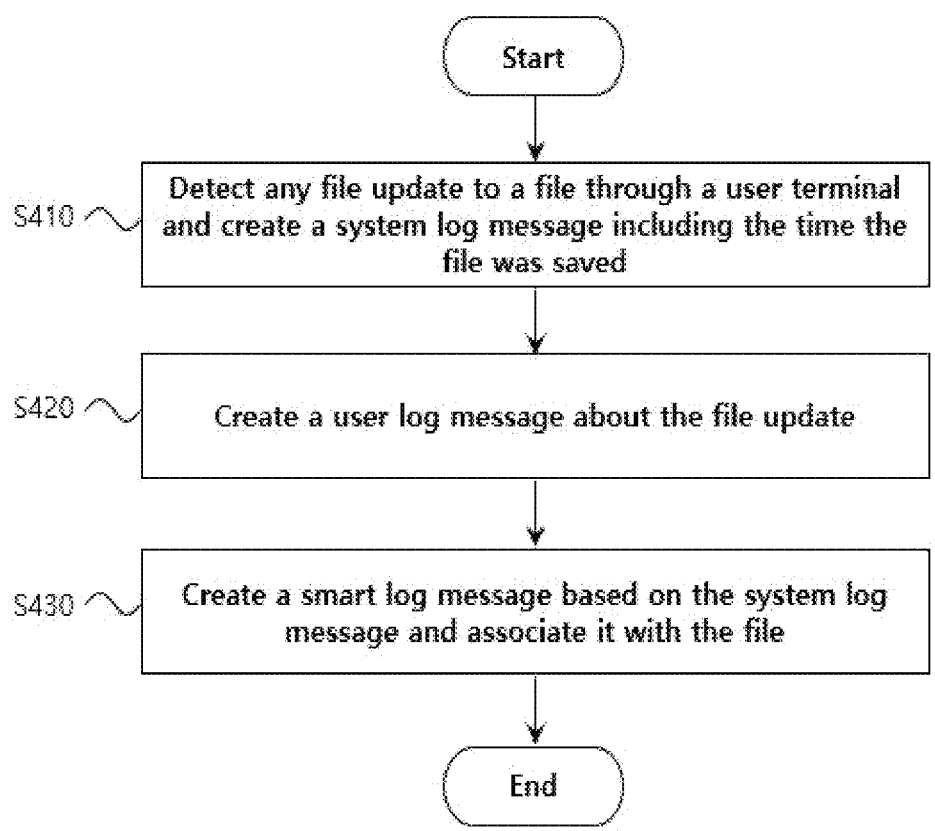
FIGS. 4 through 6 are flowcharts illustrating a smart log file management procedure performed by the processor in FIG. 2.

FIG. 4 is a flowchart illustrating a smart log file management method according to an exemplary embodiment of the present invention.

The smart log file management method according to the exemplary embodiment to be explained with reference to FIG. 4 may be performed by the processor explained with reference to FIG. 2.

In FIG. 4, the system log message creator 310 detects any file update to a file made through the user terminal 120 and creates a system log message including the time the file was saved (S410). The user log message creator 320 creates a user log message about the file update for the user terminal 120 (S420). The smart log message creator 330 creates a smart log message based on the system log message and the user log message and associates it with the file (S430).

Figure 5:
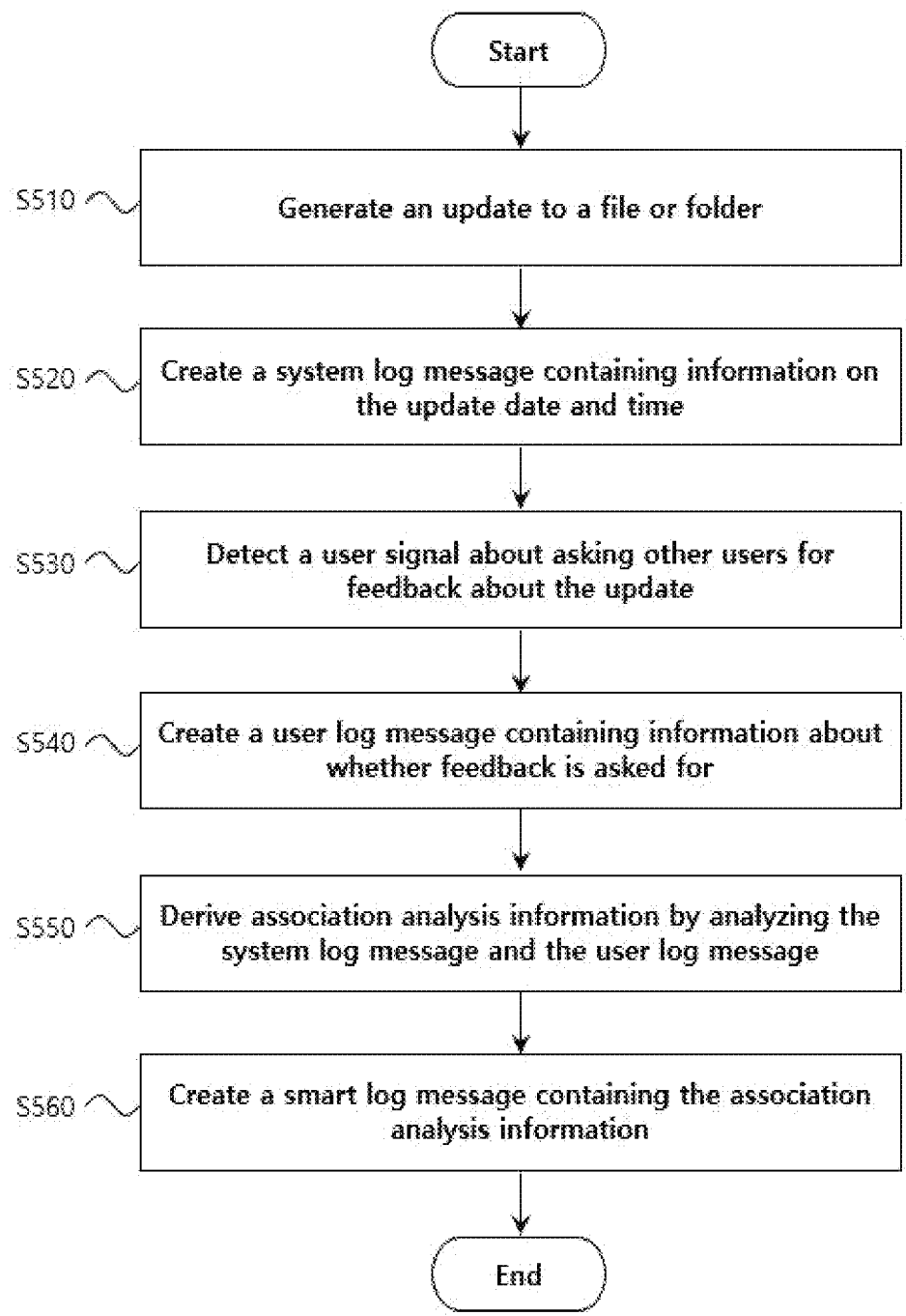

FIG. 5 is a flowchart illustrating a smart log file management method according to another exemplary embodiment of the present invention.

The smart log file management method according to the exemplary embodiment to be explained with reference to FIG. 5 may be performed by the smart log file management device explained with reference to FIG. 2 or FIG. 3.

To begin with, an update is generated as a user terminal accesses a file or folder and updates the file or folder (S510).

As explained previously, the update may include modifying or changing a folder, adding or deleting sub-folders, creating, modifying, changing, or deleting files.

When the user terminal accesses the file or folder, the smart log file management device may acquire user information corresponding to the user terminal. That is, when the user terminal accesses the file or folder, an authorization procedure is performed to grant the user terminal access such as logging in and authorize the user. In this procedure, either or both of the user terminal's user identification information and user terminal identification information may be provided as user information.

The processor of the smart log file management device may detect the above-mentioned update, create a modification history for the folder or file, and update it on a per-user basis.

The smart log file management device may then create and store information about the date and time the update was generated and create a system log message containing information on the update date and time (S520).

Here, the system log message may further contain one or more of the following: information about the date and time the user terminal accessed the folder or file, information about the date and time the file or folder was modified through the user terminal, and information about the date and time the updated file or folder was saved. Therefore, information about which user made the update when the update was generated may be managed as well.

Accordingly, the system log message may further contain user information which specifies who made the update to the folder or file and user group information to which the user belongs.

As the file or folder is updated by the user terminal, the user of the user terminal may determine whether to ask other users to give feedback after viewing the update. For example, the user terminal 120 may explicitly request feedback from other users about the update or not, or it can be viewed that a feedback request is made or not according to the system settings. That way, the smart log file management device may detect whether feedback is asked for and create a user log message (S530).

The smart log file management device may create a user log message containing information about whether feedback is asked for (S540). That is, the smart log file management device may create a user log message containing information about whether to ask other users to give feedback on the folder or file update. If the user enters a feedback request signal in order to ask other users for feedback after making the update, the smart log file management device may provide a notification message stating that feedback should be given for the update to the file or folder when other users access the file or folder later.

The user log message may further contain a checkpoint file which reflects an update, and the checkpoint file may be created and saved each time an update is made.

The user log message may further contain a user comment which is created using a user note for providing additional explanation about the update. For example, the user may make an update through the user terminal 120 and enter a user note containing some or all of the purpose, intention, and reason of the update and references to the update. That way, the smart log file management device may create the user note as a user comment and include it in the user log message.

According to another exemplary embodiment of the present invention, the user comment may be created by automatically writing a user note sample by the smart log file management device based on a file or folder update, as well as by entering a user note through the user terminal 120 by the user themselves.

That is, upon completion of a file or folder update, the processor of the smart log file management device may create a user note sample based on the content of the update. Here, a checkpoint file contained in the user log message may be used to extract details of the update and write a user note sample. The processor may present the user note sample to the user through the user terminal, and create the user note sample as a user comment upon receiving the user's approval signal for the user note sample from the user terminal. The user comment created through this procedure may be included in the user log message.

Meanwhile, the smart log file management device may derive association analysis information based on the system log message and the user log message (S550). The association analysis information may refer to statistical information produced by analyzing the system log message and the updates and user information contained in the user log message.

Here, the association analysis information contained in the smart log message may include at least one of the following: the cumulative number of updates to the folder or the files contained in the folder, the total number of modifications to the files, the average frequency of updates, the total number of feedback requests, the total number of feedback request responses, the average daily or monthly number of one or more among updates, feedback requests, and feedback requests, the feedback response rate, the number of smart log messages sent, and the folder badge or file badge.

The smart log file management device may create a smart log message containing the above-described association analysis information (S560). The smart log message may be associated with the files or folder, and the smart log message may be provided to the user terminal 120 upon the user's request or if required.

Figure 6:
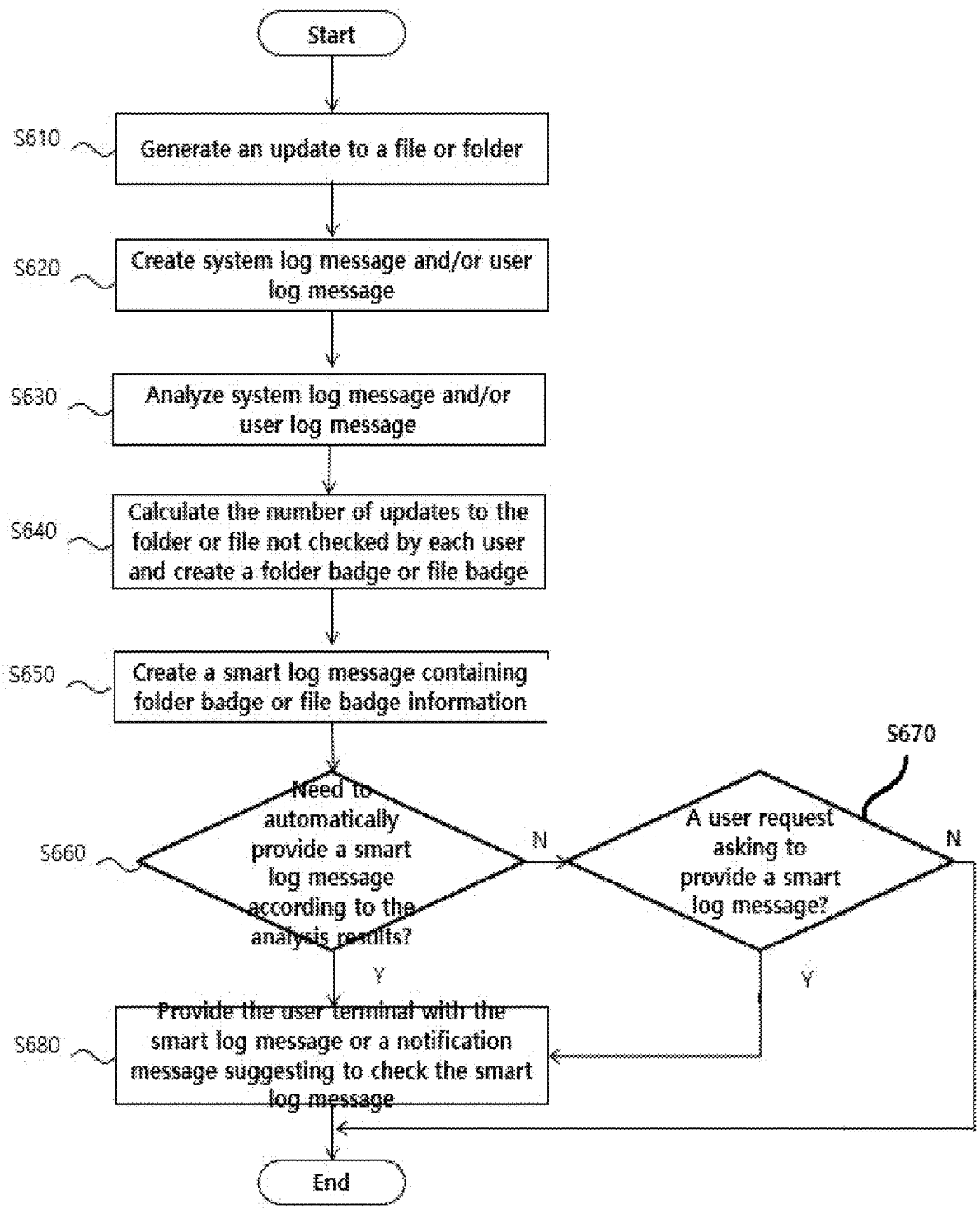

FIG. 6 is a flowchart illustrating a smart log file management method according to yet another exemplary embodiment of the present invention.

When an update to a file or folder is generated (S610), the smart log file management device may create a system log message and user log message about the update (S620). The smart log file management device may then analyze the system log message and/or user log message for the folder or file (S630).

The smart log file management device may create a folder badge for the folder or a file badge for the file by analyzing either or both of the system log message and user log message for the folder or file (S640). To create a folder badge or file badge, the number of updates to the folder or file each user has not checked may be calculated. The smart log file management device may use information about each user's access time to the folder or file or whether each user has read the update or not, in order to calculate the value of the file badge or folder badge.

The folder badge or file badge is a type of symbol indicating the number of updates not checked by each user terminal on a per-user basis, among all updates made to the folder or file. In order to create a file badge or folder badge by calculating the value of the file badge or folder badge, the smart log file management device may manage each user's own modification history for the file or folder by recording and updating them.

That is, the smart log file management device may calculate the file badge value for the file based on the number of updates recorded in the modification history. Then, the smart log file management device may calculate each user's file badge value based on each user's file access time as well as the number of updates recorded in the modification history. In this instance, if there are unchecked updates accumulated before the user's last access, the smart log file management device may view these updates as read when the user accesses the file or folder, and subtract them from the file badge value or folder badge value.

When creating a folder badge, the smart log file management device may calculate the value of the folder badge by adding up the cumulative number of unchecked updates to the folder and the cumulative number of unchecked updates to the files in the folder. If there are sub-folders within the folder, the smart log file management device may calculate the value of the folder badge for the folder by adding up the cumulative number of unchecked updates to the folder, the cumulative number of unchecked updates to the sub-folders, and the cumulative number of unchecked updates to the files in the folder and sub-folders.

When a file badge or folder badge is created through the above procedure, the smart log file management device may generate a smart log message containing association analysis results (S650). Here, the association analysis results may be information about the file badge or folder badge.

The information contained in the smart log message is the same as explained previously, so redundant explanation will be omitted.

The processor of the smart log file management device may determine whether there is a need to automatically provide a smart log message regardless of the user's request (S660). If it is determined that there is a need to provide a smart log message without the user's request, the smart log file management device may provide part of or the entire smart log message or may present a notification message recommending or suggesting to check smart log messages first (S680).

The processor of the smart log file management device may derive one or more among the priorities, importance, and urgency of information to be checked by the user from the association analysis information results divided by preset intervals. For example, if the file or folder badge value or the average file or folder badge value exceeds a certain threshold (e.g., 30), the processor may determine that the user needs to check it urgently and that there is a need to provide a smart log message regardless of the user's request.

Moreover, by comparing the association analysis information results with the those for other files or other folders, priority information, importance information, and urgency information which indicate files or folders of higher priority, importance, and urgency may be contained in the smart log message. Accordingly, the user may obtain information, like which tasks they should get done first, which updates they should give feedback on, and which files or folders they should open and check first, from the smart log message.

If it is determined that there is no need to immediately provide a smart log message, the smart log file management device finds out over again if there is a request from the user afterwards (S670). Upon receiving a user signal asking to provide a smart log message, the smart log file management device may provide the user terminal 120 with a smart log message (S680). If there is no request from the user terminal 120 to provide a smart log message, the smart log file management device may store a smart log message in a specified location or associate it with the folder or file and then terminate the process for the timing being.

Figure 7:
FIGS. 7 through 9 are views of an exemplary embodiment illustrating a process in which the smart log file management device in FIG. 1 provides a smart log message by working in conjunction with a user terminal.
Figure 8:
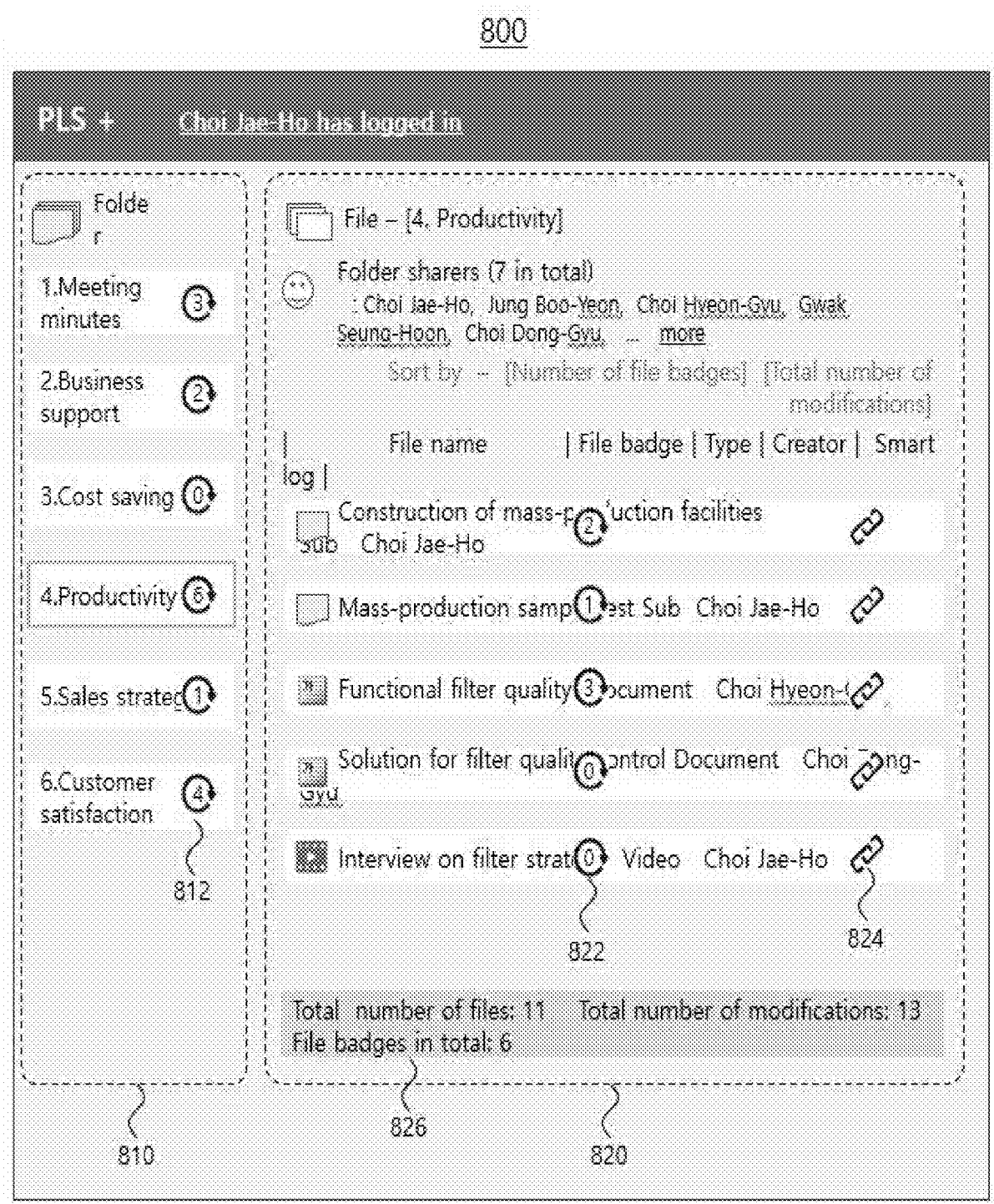
Figure 9:

FIGS. 7 through 9 are views of a process in which a smart log file management device according to an exemplary embodiment of the present invention provides a smart log message by working in conjunction with a user terminal.

More specifically, FIG. 7 shows a process in which a user terminal 120 receives a file modification request from the user via a file modification interface 700 of a smart log file agent installed on it and sends it to the smart log file management device 110. FIGS. 8 and 9 show a process in which the user terminal 120 visualizes folders, a file list, and smart log messages provided by the smart log file management device 110 via a shared folder interface 800.

In FIG. 7, upon detecting the user terminal 120's access to a specific file, the smart log file management device 110 may verify the user's access to that file and provide the specific file to the user terminal 120. Then, the user terminal 120 may present the file modification interface 700 to receive modification information about the file entered by the user via the file modification interface 700.

The user terminal 120 may receive smart log settings information through a smart log settings menu 710 of the file modification interface 700, including the settings for specifying whether to ask other users to give feedback about the file modification, specifying which users to ask for feedback, and entering the intention of the update, and may receive the content of the file modification through a file modification menu 720.

Upon receiving a file modification request containing the last smart log settings information and modification content the user entered, the user terminal 120 may send the file modification request to the smart log file management device 110 to ask it to modify the file.

Once the smart log file management device 100 receives the file modification request through the user terminal 120, it may update the file and create a system log message, a user log message, and a smart log message based on the system log message and user log message by analyzing the smart log settings information and modification content in the received file modification request in the course of updating the file.

For example, the smart log file management device 110 creates a system log message containing the time the file was saved [2017.12.02 18:07:42] and the user ID [Choi Jae-Ho].

As shown in FIG. 7, the smart log file management device 110 creates feedback request information for [asking all folder participators for feedback] as a first sub-message of the user log message, based on the smart log settings information. Also, the smart log file management device 110 creates a checkpoint file reflecting the file update as a second sub-message, and crates a user note [Modified the overall content by changing sub-themes] as a third sub-message based on the smart log settings information. Also, the smart log file management device 110 may create each user's file badge for the file update as a forth sub-message and crate a smart log message based on the system log message and the user log message.

The smart log file management device 110 may notify of the file update when a user terminal 120 associate with one of the folder participators logs in, according to the feedback request settings. If the user terminal 120 modifies the file in response to the notification, a response message for the first sub-message may reflect that the modification is made in response to the notification.

In FIG. 8, the user terminal 120 may attempt to access a specific folder in a folder list as the user chooses, and, when the access is allowed, may receive information about a list of files in the folder, file badges for each user, and smart log messages from the smart log file management device 110 and display it via a shared folder interface 800.

The user terminal 120 may visualize a list of folders accessible by the user through a folder window 810, and show the cumulative count of file badges for each folder provided by the smart log file management device 110 through a folder file badge cumulative symbol 812. For example, in the case of the currently selected [4. Productivity] folder in FIG. 8, the file badge cumulative count for all files in the folder may be marked as 6.

The user terminal 120 may visualize the file list received from the smart log file management device 110 and the metadata of the files. The user terminal 120 may display the user's file badges for each file through file badge symbols 822 in the file window 820. For example, the user "Choi Jae-Ho"s file badges may be marked as [3], [0], and [0] through the file badge symbols 822 for the files "Functional filter quality", "A solution for filter quality control", and "Interview on filter strategy" in the [4. Productivity] folder.

Among these file badges, the file badge [3] of "Functional filter quality" indicates that a total of three modifications were made by other users after the user "Choi Jae-Ho" last opened or downloaded the file. For the sub-folders in the folder, the user terminal 120 may show the cumulative count of file badges for all files in the sub-folders through file badge symbols 822.

The user terminal 120 may display an access link for accessing a smart log message associated with each file through a smart log link symbol 824.

The user terminal 120 may visualize the total number of files in the folder and its sub-structure (total number of files: 11), the sum of modifications made to all files (total number of modifications: 13), and the sum of file badge values at present counted for all files (cumulative file badge value: 6)

Upon completion of modifying a specific file, the user terminal 120 may receive each user's file badge for each file updated by the modification from the smart log file management device 110 and update it through the file window 820.

In FIG. 9, upon receiving a request for access to a smart log message for a specific file through a smart log link symbol 824 in the file window 820, the user terminal 120 may send the access request to the smart log file management device 110, receive a smart log message associated with the file from the smart log file management device 110, and visualize the smart log message through a smart log window 830.

The user terminal 120 may provide a notification message indicating the modifier (Choi Jae-Ho), the modified date, the type of modification (creation and modification), and whether the modification was made in response to a feedback request through a file modification basic information field 832 in the smart log window 830, and if a number of updates are made to the same file, may sequentially arrange and show notification messages about the updates in chronological order.

The user terminal 120 may visualize a first checkpoint file (file before modification), which is created by copying the file before the modification, through a file-before-modification field 834 in the smart log window 830 and then visualize a second checkpoint file (file after modification), which reflects the file modification, through a file-after-modification field 836. The user terminal 120 may visually display what was modified by overlaying a modification comparison indicator 838 at a position relative to where the second checkpoint file is different from the first checkpoint file.

When the user selects a different one from a plurality of file modification basic information fields 832, the user terminal 120 may visualize the checkpoint files for the selected modification anew through a file-before-modification field 834 and a file-after-modification field 836.

The disclosed technology has the following advantages. However, since it does not mean that a specific embodiment should have all the advantages or should have only the advantages, it should not be understood that the range of the rights of the disclosed technology are limited by the advantages.

A smart log file management device and method according to an exemplary embodiment of the present invention may improve user convenience because the system and method allow for efficient management of file updates by a user and let the user intuitively know about them.

A smart log file management device and method according to an exemplary embodiment of the present invention may support facilitating the sharing of updates to be notified between file sharers by responses from users in a file updating process.

Although preferred exemplary embodiments of the present invention have been described above, those skilled in the art will understand that the present invention may be variously modified and changed without departing from the spirit and scope of the present invention described in the following claims.

What is claimed is:

1. A smart log file management device comprising a memory and a processor electrically connected to the memory, the processor being configured to:
   create a system log message containing information about an update to a folder or a file in the folder, based on the folder or file being updated by a user terminal associated with a user;
   create a user log message containing information about the user related to the update to the folder or the file;
   create a smart log message containing association analysis information which is statistical information obtained by analyzing either or both of the system log message and the user log message,
   wherein the association analysis information contained in the system log message includes information about a file badge and folder badge indicating a number of updates not checked by the user terminal,
   wherein the number of updates not checked by the user terminal includes a cumulative number of all updates made to the folder and the file that are not checked by the user terminal, and
   wherein the updates made to the folder are different than the updates made to the file; and
   output the file badge and the folder badge to the user terminal to display the file badge and the folder badge on the user terminal.

2. The smart log file management device of claim 1, wherein the system log message further contains one or more of the following: information about a time the update was made, information about a date and time the user terminal accessed the folder or file, information about a date and time the file or folder was modified through the user terminal, and information about a date and time the updated file or folder was saved.

3. The smart log file management device of claim 2, wherein the processor derives one or more among priorities, importance, and urgency of information to be checked by the user from the association analysis information divided by preset intervals, and the smart log message further contains one or more among the priorities, importance, and urgency of information.

4. The smart log file management device of claim 1, wherein the system log message further contains user information which specifies who made the update to the folder or file and user group information to which the user belongs.

5. The smart log file management device of claim 4, wherein, when the user terminal accesses the file or folder, the processor performs an authorization procedure in which either or both of the user terminal's user identification information and user terminal identification information are provided as the user information.

6. The smart log file management device of claim 1, wherein the user log message further contains feedback request information indicating whether to ask other users to give feedback on the update, a checkpoint file reflecting the update, and a user comment which is created using a user note for providing additional explanation about the update.

7. The smart log file management device of claim 6, wherein the processor creates a user note sample based on content of the update upon completion of the file or folder update and provides the user note sample to the user terminal, and includes the user note sample as the user comment in the user log message upon receiving an approval signal for the user note sample from the user terminal.

8. The smart log file management device of claim 6, wherein, upon receiving a feedback request signal for the update from the user terminal, the processor creates the feedback request information and includes the feedback request information in the user log message.

9. The smart log file management device of claim 8, wherein, if the feedback request signal is included in the user log message, the processor outputs a feedback request message to another terminal upon detecting the another terminal's access to either or both of the folder and the file.

10. The smart log file management device of claim 1, wherein the update includes one or more of the following: modifying the folder, changing the folder, modifying the file in the folder, changing the file in the folder, deleting the file in the folder, and adding the file in the folder, and
    wherein the processor detects the update and updates each user's modification history for the folder or file.

11. The smart log file management device of claim 10, wherein a file badge value for the file is calculated based on the number of updates recorded in the modification history.

12. The smart log file management device of claim 10, wherein the processor calculates each user's file badge value based on each user's file access time as well as the number of updates recorded in the modification history.

13. The smart log file management device of claim 1, wherein the processor calculates a value of the folder badge by adding up a cumulative number of unchecked updates to the folder and a cumulative number of unchecked updates to the file in the folder, the unchecked updates to the folder being different than the unchecked updates to the file in the folder.

14. The smart log file management device of claim 13, wherein, if there are sub-folders within the folder, the processor calculates the value of the folder badge by adding up the cumulative number of unchecked updates to the folder, a cumulative number of unchecked updates to the sub-folders, and the cumulative number of unchecked updates to the file in the folder and sub-folders.

15. The smart log file management device of claim 1, wherein the association analysis information contained in the smart log message includes at least one of the following: a cumulative number of updates to the folder or the files contained in the folder, a total number of modifications to the files, an average frequency of updates, a total number of feedback requests, a total number of feedback request responses, an average daily or monthly number of one or more among updates, feedback requests, and feedback responses, feedback response rate, a number of smart log messages sent, and the folder badge or file badge.

16. The smart log file management device of claim 1, wherein, if a file badge value or folder badge value exceeds a preset value, the processor automatically provide the user terminal with the smart log message for the file or folder or a message suggesting to check the smart log message.

17. The smart log file management device of claim 1, wherein the updates made to the folder include a creation of a new sub-folder in the folder or a change in participation of the folder.

18. The smart log file management device of claim 1, wherein the processor outputs a file badge for an updated file to the user terminal based on completion of an update made to the updated file.

19. A smart log file management method which is performed by a smart log file management device comprising a memory and a processor electrically connected to the memory, the method comprising:
    creating a system log message containing information about an update to a folder or a file in the folder, based on the folder or file being updated by a user terminal associated with a user;
    creating a user log message containing information about the user related to the update to the folder or the file;
    creating a smart log message containing association analysis information which is statistical information obtained by analyzing either or both of the system log message and the user log message,
    wherein the association analysis information contained in the system log message includes information about a file badge and folder badge indicating a number of updates not checked by the user terminal,
    wherein the number of updates not checked by the user terminal includes a cumulative number of all updates made to the folder and the file that are not checked by the user terminal, and
    wherein the updates made to the folder are different than the updates made to the file; and
    outputting the file badge and the folder badge to the user terminal to display the file badge and the folder badge on the user terminal.

20. A non-transitory computer-executable recording medium having embodied thereon a program, which when executed by a computer causes the computer to execute a smart log file management method, the method comprising:
    creating a system log message containing information about an update to a folder or a file in the folder, based on the folder or file being updated by a user terminal associated with a user;
    creating a user log message containing information about the user related to the update to the folder or the file;
    creating a smart log message containing association analysis information which is statistical information obtained by analyzing either or both of the system log message and the user log message,
    wherein the association analysis information contained in the system log message includes information about a file badge and folder badge indicating a number of updates not checked by the user terminal, wherein the number of updates not checked by the user terminal includes a cumulative number of all updates made to the folder and the file that are not checked by the user terminal, and wherein the updates made to the folder are different than the updates made to the file; and outputting the file badge and the folder badge to the user terminal to display the file badge and the folder badge on the user terminal.

\* \* \* \* \*